United States Patent [19]

Chethik

[11] Patent Number: 5,432,787
[45] Date of Patent: Jul. 11, 1995

[54] PACKET DATA TRANSMISSION SYSTEM WITH ADAPTIVE DATA RECOVERY METHOD

[75] Inventor: Frank Chethik, Palo Alto, Calif.

[73] Assignee: Loral Aerospace Corporation, New York, N.Y.

[21] Appl. No.: 217,599

[22] Filed: Mar. 24, 1994

[51] Int. Cl.$^6$ .............................................. H04J 3/14
[52] U.S. Cl. ...................... 370/79; 370/94.1; 371/37.7
[58] Field of Search ................ 370/79, 80, 82, 83, 370/84, 18, 19, 17, 92, 60, 94.1, 99, 95.1; 371/2.1, 3, 4, 5.1, 5.4, 5.5, 24, 27, 39, 37.7, 32, 41, 49.1, 49.2, 54; 375/19

[56] References Cited

U.S. PATENT DOCUMENTS

| | | | |
|---|---|---|---|
| 3,885,105 | 5/1975 | Hildenbrand | 370/18 |
| 4,377,862 | 3/1983 | Koford et al. | 371/32 |
| 4,447,902 | 5/1984 | Wilkinson | 371/39 |
| 4,507,782 | 3/1985 | Kunimasa et al. | 371/32 |
| 4,599,722 | 7/1986 | Mortimer | 371/37 |
| 4,769,818 | 9/1988 | Mortimer | 371/37 |
| 4,888,767 | 12/1989 | Furuya et al. | 370/95.2 |
| 5,130,992 | 7/1992 | Frey, Jr. et al. | 371/401 |

OTHER PUBLICATIONS

"Packet Video and Its Integration into the Network Architectur", IEEE Journal on Selected Areas in Communications, vol. 7, No. 5, Jun. 1989.
"Packet Recovery in High-Speed Networks Using Coding and Buffer Management" pp. 124-131 May 1990.

Primary Examiner—Douglas W. Olms
Assistant Examiner—Huy D. Vu
Attorney, Agent, or Firm—Perman & Green

[57] ABSTRACT

A packet communication system transmits a stream of L data packets with at least one parity packet transmitted as an $L+1^{th}$ packet. The parity packet comprises at least, N data segments, each ith data segment being the modulo-2 sum of all identically positioned data segments in the stream of L packets. A node includes adaptive packet stream transmission apparatus which comprises a packet queue for holding a series of packets ready for transmission to a destination node. The adaptive packet stream transmission mechanism further includes modulo-2 sum circuitry for deriving a parity packet for each L transmitted data packets. Transmission control circuitry selectively enables transmission of a parity packet after each L data packets have been transmitted. A processor in the node controls the transmission control circuitry to vary the value of L in accordance with a determined network metric. The network metric may indicate a level of network congestion, with the processor increasing the value of L if the network metric manifests a lessened network congestion, and vice versa. The processor is also adapted to vary the value of L in accordance with a data error rate metric.

13 Claims, 1 Drawing Sheet

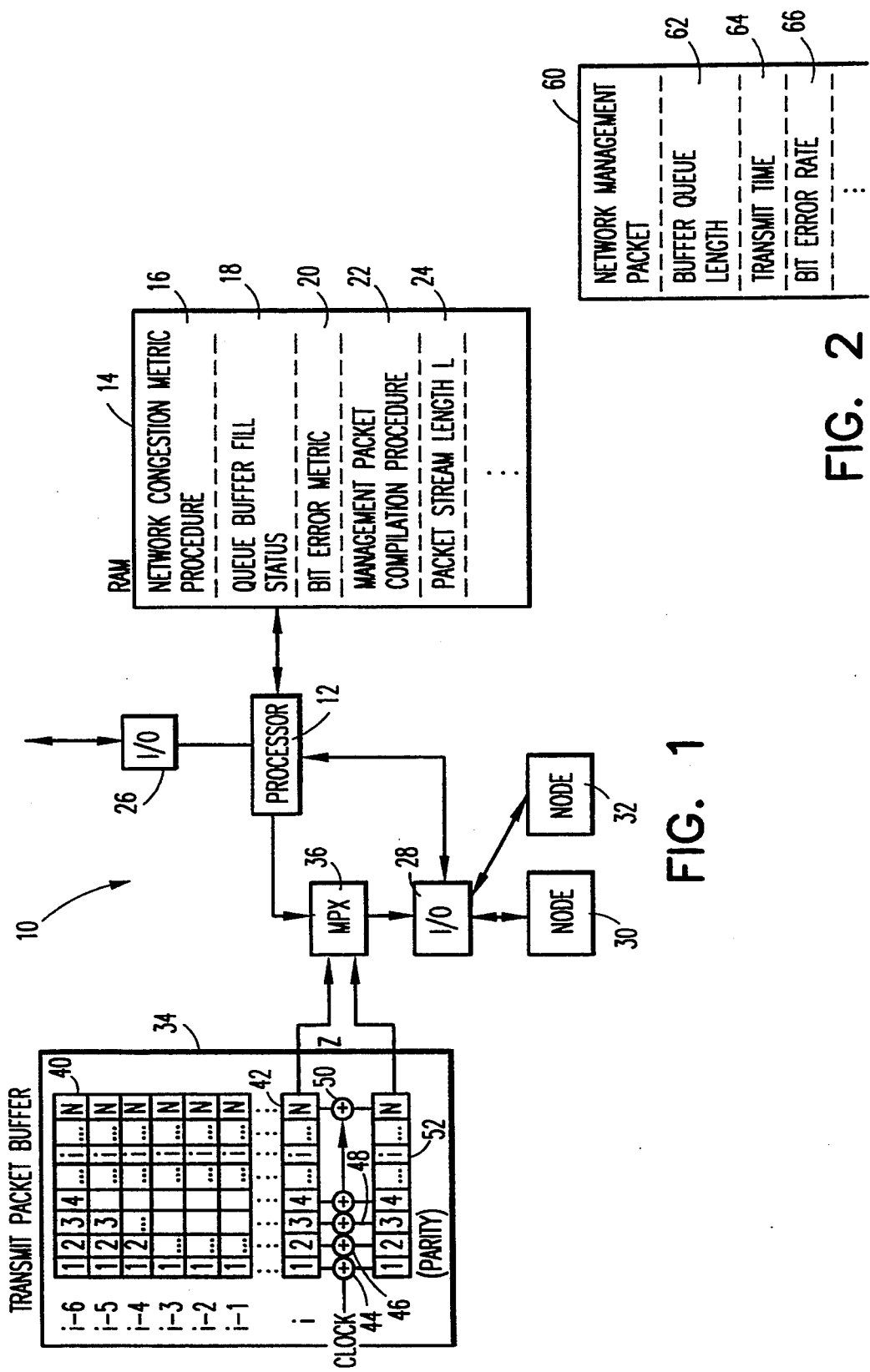

PACKET DATA TRANSMISSION SYSTEM WITH ADAPTIVE DATA RECOVERY METHOD

FIELD OF THE INVENTION

This invention relates to packet data transmission systems and, more particularly, to a parity-based packet/data transmission system for restoring lost packets, the packet loss recovery system being adaptive to network conditions.

BACKGROUND OF THE INVENTION

In asynchronous transfer mode packet protocols and other packet switched systems, a current procedure for restoration of packets lost in transmission is by means of automatic retransmission requests. In a system where transmission latency through the network is a few packets or 10's of packets, the size of transmission buffers required to be maintained at transmitting nodes and receiving nodes is small for automatic transmission request protocol exchanges. However, in transmission systems where path delays are large, i.e., where the path includes satellite links or long distance optical fiber links carrying high data rates, accommodation of an automatic retransmission request protocol may incur very large data buffers. Further, in data networks where communications occur over a large variety of links, each node must retain a buffering capacity that is related to the longest delay path (in numbers of packets in transition over the network).

Packet losses in a packet network may result from buffer overflows, switch contentions or from interference and noise encountered in typical links that comprise the network. The major share of packet losses result from buffer overflows and from switch blockages and contention. The probability of packet loss is statistically determined by the percentage of the maximum network capacity that the actual traffic represents. In certain systems, packet loss probabilities and network delay queue lengths become intolerably large when the traffic approaches a range of approximately 35% of maximum network capacity.

New networks, termed "fast packet networks", use asynchronous optical network media, have enormous capacity and very high noise immunity over their individual links. In such networks most packet losses come from electronic switching and buffers, rather than from optical transmission portions of the network. Such networks span the continental United States and interconnect continents via transoceanic cables. In those networks, delays due to propagation are long and nodal buffers needed to store packets for possible retransmission can become very large for a busy traffic nodes in the network. This places great importance on the ability of the networks' packet recovery system to dispense with almost all re-transmission requests since most node buffer assets to support re-transmission are otherwise occupied.

To reduce retransmission requests over the network, prior art systems have used various parity systems to enable recovery of individual data segment losses or entire packet losses at a destination node. Various of such systems can be found in the following U.S. Pat. Nos. 4,888,767 to Furuya et al.; 4,507,782 to Kunimasa et al.; 4,447,902 to Wilkinson; 4,599,722 to Mortimer; and 4,769,818 to Mortimer. Error recovery in packet systems used for video information is also considered in "Packet Video and Its Integration Into the Network Architecture" Karlsson et al, IEEE Journal on Selected Areas in Communications, Vol. 7, No. 5, June, 1989, pp. 739-751.

An effective recovery system that enables recovery of data fields from a series of packets is described by Shacham et al. in "Packet Recovery in High Speed Networks Using Coding and Buffer Management", INFOCOM PROCEEDINGS, 1990, pp. 124-131. Shacham et al. divides groups of data packets into blocks of packets of a predetermined size ("L") and adds to each block a number of parity packets that contain error-control bits. The number of parity packets determines the maximum number of lost data packets that can be recovered. Shacham et al. compute a parity packet as follows: the first bit of a parity packet is the modulo 2 sum (exclusive or) of the first bit of the data field of all L packets comprising a block; the second bit of the parity packet is the modulo 2 sum of the second bit of the data field of the L packets and so on. The parity packet is transmitted as the $(L+1^{th})$ packet after transmission of the L data packets.

At a destination node, the received L packets are stored in a buffer, together with the $L+1^{th}$ parity packet. If one packet is determined to be missing or is received in error (e.g. a succession number is incorrect or a CRC check indicates a failure), the receiving node computes a modulo-2 sum for each bit in data fields in properly received packets and includes the parity packet in that computation. The result is a reconstruction of the data field of the errant packet.

The use of additional parity packet(s) for a block of packets places an increased load on the network and further leads to possible additional network congestion. However, the parity packet procedure does enable effective recovery of lost data packets and in many system applications, it will reduce last packet probability to an acceptably low value.

Accordingly, it is an object of this invention to provide an improved packet recovery system that is adaptive to network congestion conditions.

It is another object of this invention to provide an improved packet recovery system that employs parity packets to enable packet recovery, wherein a block of packets of size L, for which a parity may be varied in size in accordance with network conditions.

It is yet another object of this invention to provide a packet recovery system that is adaptive in accordance with a determined buffer fill status indication, bit error rate indications, and/or packet transmission latency parameters.

SUMMARY OF THE INVENTION

A packet communication system transmits a stream of L data packets of identical size with at least one parity packet transmitted as an $L+1^{th}$ packet. The parity packet comprises at least, N data segments, each ith data segment being the modulo 2 sum of all identically positioned data segments in the stream of L packets. A node includes adaptive packet stream transmission apparatus which comprises a packet queue for holding a series of packets ready for transmission to a destination node. The adaptive packet stream transmission mechanism further includes modulo-2 sum circuitry for deriving a parity packet for each L transmitted data packets. Transmission control circuitry selectively enables transmission of a parity packet after each L data packets have been transmitted. A processor controls the transmission control circuitry to vary the value of L in accordance with a determined network metric. The network metric may indicate a level of network congestion, with the processor increasing the value of L if the network metric manifests a lessened network congestion, and vice versa. The processor is also adapted to vary the value of L in accordance with a data error rate metric.

DESCRIPTION OF THE DRAWINGS

FIG. 1 is a high level block diagram of a node that incorporates the invention;

FIG. 2 is a schematic of a network management packet employed by the invention to enable network metrics to be calculated by a node.

DETAILED DESCRIPTION OF THE INVENTION

Referring to FIG. 1, a node 10 includes a processor 12 that controls overall operation of node 10. Associated with processor 12 is a random access memory (RAM) 14 which stores, among other programs, a network congestion metric procedure 16, a queue buffer fill status value 18, a bit error metric value 20, a management packet compilation procedure 22 and a packet stream length 24 of value L.

Node 10 further includes an input/output (I/O) module 26 which receives packets from previous nodes and an input/output (I/O) module 28 which enables output of packets to destination nodes (e.g., nodes 30, 32, etc.).

Node 10 further includes a transmit packet buffer 34 that enables processor 12 to construct outgoing packets for transmission via a multiplexer 36, I/O module 28, to a destination node. Transmit packet buffer 34 is essentially a first-in/first-out (FIFO) buffer that includes a plurality of registers 40. Each register 40 includes N bit storage positions, where N is the total number of bits in a packet. As a packet works its way down transmit packet buffer 34, it reaches a register 42 where it is ready for transmission, via multiplexer 36 and I/O module 28 to a destination node.

When a packet arrives at register 42, each bit value of the packet is fed through a modulo 2 sum adder 44, 46, 48 ... 50, to a parity packet register 52. In this manner, the bit values in parity packet register 52 continually represent the modulo 2 sum of all like bit positions of packets that have reached register 42 and have been transmitted.

Every L packets that are transmitted from register 42 are followed by a parity packet from parity packet register 52, through the action of multiplexer 36, in response to control signals from processor 12. Processor 12, however, controls the value of L in accordance with plural network metrics that enable processor 12 to adjust the value of L in accordance with network congestion, bit error rate variations or other network parameters.

In FIG. 2, a network management packet 60 is illustrated that enables processor 12 to derive data from destination nodes that enables an adjustment of the value of L. Network management packet 60, among other data parameters, includes a buffer queue length field 62, a transmit time field 64 and a bit error value 66.

Periodically, processor 12 causes transmission of a network management packet 60 to a destination node (or nodes). Such node (or nodes) returns network management packet 60 to processor 12 and inserts determined values in fields 62, 64 and 66, respectively. For instance, when processor 12 causes a network management packet 60 to be transmitted, it inserts a transmit time into field 64 so that when network management packet 60 is returned from a destination node (or nodes), the transmission time of the packet can be determined. If the transmission time exceeds a predetermined value, processor 12 increases the value of L to decrease packet recovery overhead load in the network.

A succeeding node that receives a network management packet 60 may insert a value in buffer queue length field 62 that is indicative of the length of its buffer queue. Further, it may insert a value in field 66 that is indicative of bit error induced failures that have been experienced with preceding packets. Processor 12, upon receiving a return management packet 60 employs the values in a packet 60 to adjust the value of L so as to either increase its value when network statistics indicate low network congestion and/or low bit error rates or to decrease the value of L in the event of high network congestion and/or high bit error rates. Lower values of L enable more parity packets to be transmitted and assure an ability to recover more lost packets (and vice-versa).

Network management packets 60 must be transmitted with sufficient redundancy to guarantee survival. These packets are transmitted only occasionally (consistent with long term rates of change of network status) on intervals of minutes to 10's of minutes. Network management packets 60 represent less than 1% of additional load to the network and do not impact upon overall network loading.

While bounds for the value of L may vary in accordance with a specific network, it is preferred that the lower bound on the span of L be approximately 7 during heavy congestion or in a high bit error state. The value of L may increase to as many as 31 packets for low error rate and congestion network states.

If node 10 (or any succeeding node, e.g. 30 or 32), detects a change in local congestion, it initiates a dialogue with a preceding node and the parameter L is suitably altered. In this manner, parameter L is caused to adapt to network conditions and cooperating nodes coordinate their recovery operations.

As an example of the procedure employed by a node 10, assume processor 12 transmits a network management packet 60 and, upon receiving a response from node 30, finds that node 30 indicates an extended buffer queue length in field 62. In such case, processor 12 decreases the value of L so that a parity packet is only issued for every decreased L value of packets, thereby improving the packet recovery power. Also, if network management packet 60 is received and indicates a high bit error rate value in field 66, processor 12 causes multiplexer 36 to decrease the value of L so that more parity packets are issued during the higher network error rate environment. Finally, if network management packet 60 is returned showing a longer-than expected transmit time in field 64 from a distant node (even if values in buffer queue length 62 and bit error metric in field 66 are within predetermined boundaries), it may decrease the value of L so that more frequent parity packets are issued—it having been determined that the network delays (i.e. congestion) to a distant node are greater than expected.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A communications system for transmitting between a source node and a destination node, packets having N data segments, said packets transmitted by said source node in streams of L data packets, N and L being integers, at least one parity packet transmitted as an $(L+1)^{th}$ packet by said source node after each stream of L packets, said parity packet comprising N data segments, each one of said N data segments in said parity packet being a modulo 2 sum of all identically positioned data segments in said stream of L packets, each node including adaptive packet stream transmission means comprising:

packet queue means for holding a series of packets that are ready for transmission to a destination node;

transmission means coupled to said packet queue means for transmitting said packets;

modulo 2 sum means for deriving a parity packet for L transmitted data packets;

transmission control means coupled to said transmission means for selectively enabling said transmission means to transmit a parity packet after each L data packets have been transmitted to said destination node; and processor means coupled to said transmission control means for determining a network metric which indicates a network condition and for controlling said transmission control means to vary a value of L during operation of said communication system in accordance with said determined network metric.

2. The communications system as recited in claim 1, wherein said processor means increases said value L when said network metric manifests an improved network condition and decreases said value L when said network metric indicates a deteriorated network condition.

3. The communications system as recited in claim 1 wherein said network metric indicates a level of network congestion.

4. A communications system as recited in claim 3 wherein said processor means receives a packet from a destination node that reports a transmit buffer queue length value, said processor means employing said value to derive said value L.

5. A communications system as recited in claim 3 wherein said processor means causes intermittent transmission of management packets to a destination node that causes said destination node to transmit a transmit buffer queue length report to said processor means.

6. The communications system as recited in claim 5 wherein said processor means transmits said management packet to plural nodes and derives said value L from queue length values reported by said plural nodes via a returned management packets.

7. The communications system as recited in claim 1 wherein said processor means includes upper and lower boundaries for said value L.

8. The communications system as recited in claim 1 wherein said processor means causes intermittent transmission of management packets to a destination node, said management packet causing said destination node to respond with a reply packet, said processor means determining a transmission delay time from said reply packet and adjusting said value of L in accordance therewith.

9. The communications system as recited in claim 8 wherein said processor means decreases said value L where a transmission delay time exceeds a determined threshold value.

10. The communications system as recited in claim 9 wherein said processor means increases said value L when a transmission delay time is less than a said determined threshold value.

11. The communications system as recited in claim 1 wherein said processor means causes intermittent transmission of management packets to a remote node, a said management packet causing a remote node to respond with a reply packet including a bit error rate experienced at said remote packet, said processor means adjusting said value of L in accordance with a said bit error rate value determined from said reply packet.

12. The communications system as recited in claim 11 wherein said value L is increased by said processor means when said bit error rate is determined to be less than a determined threshold.

13. The communications system as recited in claim 12 wherein said value L is decreased by said processor means when said bit error rate is determined to be greater than a predetermined threshold.

* * * * *